Patented May 11, 1943

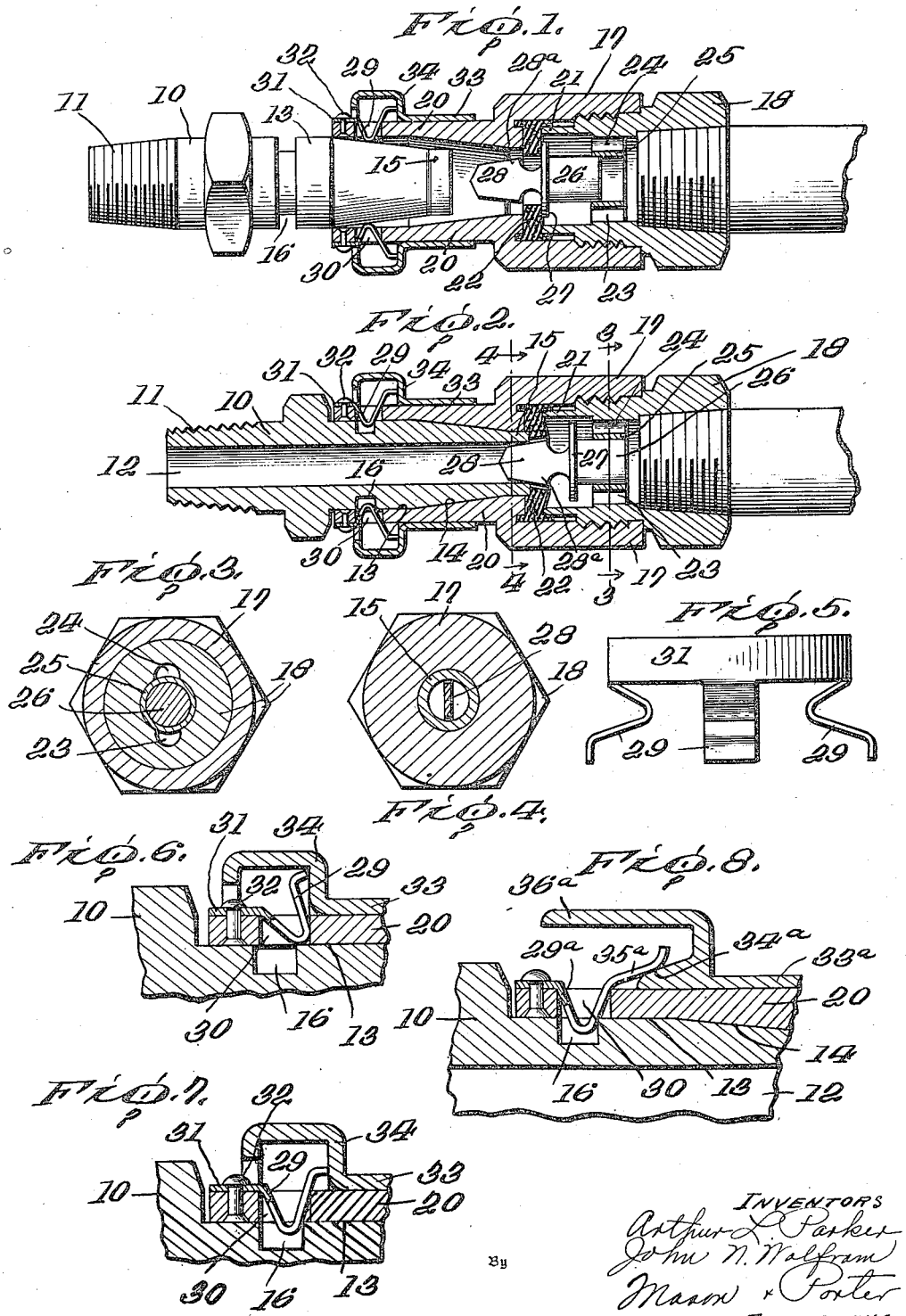

2,318,965

UNITED STATES PATENT OFFICE 2,318,965

VALVED COUPLING

Arthur L. Parker and John N. Wolfram, Cleveland, Ohio; said Wolfram assignor to said Parker Application March 31, 1941, Serial No. 386,200

6 Claims. (Cl. 284—19)

The present invention relates to new and useful improvements in couplings, and more particularly to improvements in a valved coupling which may be conveniently used for rapidly attaching and detaching conduit sections or extensions of a fluid pressure system.

In various pressure systems, it is often necessary to attach conduit extensions to fixed supply outlets or to add conduit sections to the conduit extensions in order to facilitate the distribution of the fluid to the desired locations. The coupling of the present invention is particularly adapted for use in connection with the oxygen system of aircraft although it may be used in other systems where it is desirable to be able to quickly attach or detach the conduit sections or extensions. The coupling includes male and female coupling members which can be rapidly attached or detached. In order to prevent leakage of fluid during the attaching or detaching of the coupling members, the coupling member which is connected to the source of supply is provided with a valve which is automatically operable to close the conduit when the coupling members are separated and which is automatically operable to open the conduit when the coupling members are connected together.

An object of the present invention is to provide a coupling of the above type which is simple in construction and inexpensive to manufacture and which is constructed and arranged so as to conform with weight and size requirements.

Another object of the invention is to provide a coupling of the above type wherein spring means are employed for maintaining the coupling members connected and wherein the construction of the spring holding means is such as to permit connection of the coupling members without manual operation of the holding means.

A further object of the invention is to provide a coupling of the above type wherein an operating member is provided for releasing the spring holding means when it is desired to separate the coupling members and wherein the operating member is shiftable for this purpose in the direction of withdrawal of one of the coupling members.

The above and other objects of the invention will in part be obvious and will be hereinafter more fully pointed out.

In the accompanying drawing:

Figure 1 is a side view showing the coupling members separated, the valve-carrying coupling member being shown in section.

Figure 2 is a longitudinal sectional view showing the coupling members connected.

Figure 3 is a section taken along the line 3—3 of Figure 2.

Figure 4 is a section taken along the line 4—4 of Figure 2.

Figure 5 is a side elevation showing the spring holding means.

Figure 6 is an enlarged fragmentary sectional view showing the position of the operating member and the spring holding means when it is desired to separate the coupling members.

Figure 7 is an enlarged fragmentary sectional view showing the position of the holding means when the coupling members are connected.

Figure 8 is a longitudinal section showing a modified form of operating member.

Referring more in detail to the accompanying drawing, the coupling is illustrated as including detachable coupling members in the form of male and female sections. The male coupling member 10 includes an externally threaded end portion 11 which may be connected to any suitable conduit. The male coupling member is also provided with a longitudinal passage 12 therethrough and the opposite end of the male coupling member is in the form of a nipple which is provided with cylindrical portion 13, a tapered portion 14 and a reduced cylindrical end portion 15. The cylindrical portion 13 is provided with an annular groove 16 which is for the purpose of receiving locking or holding means to be hereinafter fully described.

The female coupling member includes a body portion 17 having one end thereof internally threaded to receive an adapter portion 18 which is adapted to be connected to the source of fluid under pressure. The opposite end of the body portion 17 is provided with an inwardly directed annular shoulder portion 19 and with an extended skirt portion 20, the inner surface of which is shaped to substantially conform with the tapered portion 14 on the male coupling member.

The inner end of the adapter portion 18 is provided with a skirt portion 21 which is adapted to compress and firmly hold an annular packing washer 22 against the shoulder portion 19 so as to effectively prevent the leakage of fluid. Intermediate the ends of the adapter portion 18, there is provided a web portion 23 which has side fluid passages 24 (Figure 3) and a central opening within which a sleeve member 25 is press-fitted. This sleeve member 25 serves as a guide for a valve stem 26. The valve stem carries an outwardly extending valve surface 27 which is adapted to contact the inner surface of the packing washer 22 so as to close the conduit when the coupling members are separated (Figure 1). The valve surface 27 carries a projecting rib portion 28, the base 28a being tapered outwardly so as to contact with the inner edge of the cylindrical portion 15 on the male coupling member when the coupling members are connected together. Thus, relative movement of the coupling members toward one another for connecting the same will serve to force the valve surface 27 away from contact with the packing washer 22 so as to permit the passage of fluid into the passage 12 of the male coupling member.

The outer end of the sleeve extension 20 on the female coupling member is provided with a plurality of spaced openings 30 which are positioned in substantial alignment with the groove 16 in the cylindrical portion 13 in the male coupling member when the coupling members are connected (Figure 2). Holding or latching elements in the form of spring arms 29 extend from a ring member 31 which is secured by rivets 32 or the like around the end of the sleeve portion 20. These spring arms are spaced symmetrically with respect to the openings 30 and are shaped so as to normally extend through these openings. The free end of each spring arm 29 is bent outwardly and extends beyond the outer surface of the sleeve portion 20 for cooperation with an operating member in the form of a sleeve 33 which is mounted for limited axial movement on the sleeve portion 20. The sleeve member 33 is provided with an outwardly extending shoulder portion 34 which is adapted to cooperate with the free end 35 of each spring arm 29. Thus, the operating sleeve 33 is prevented from falling off the female coupling member by engagement between the shoulder portion 34 and the ends of the spring arms.

In the position shown in Figures 2 and 7, the spring arms 29 extend through the openings 30 and into the annular groove 16 in the male coupling member. In this position of the spring arms, the male coupling member is prevented from being withdrawn from the female coupling member and the spring arms thus serve as latches to maintain the coupling members connected together. In this connected position of the coupling members, fluid may pass through the openings 24 around the valve surface 27 and into the passageway in the male coupling member. The operating sleeve 33 is provided with a housing portion 36 which serves to house the free ends of the spring arms 29. When it is desired to separate the coupling members, the sleeve 33 is shifted outwardly to the position shown in Figure 6 and during this movement of the sleeve 33, the shoulder 34 will engage the free ends 35 of the spring arms so as to withdraw the arms from the annular groove 16. Thus, the coupling members can be separated and the pressure of the fluid from the source of supply will force the valve surface 27 into sealing contact with the packing 22, as shown in Figure 1. When connecting the coupling members, it will be seen that no manual shifting of the spring arms is necessary because the inward movement of the male coupling member will in itself force the spring arms outwardly until the groove 16 is positioned beneath the openings 30 so that the spring arms will then snap into the groove 16 and prevent separation of the coupling members.

In the modification shown in Figure 8, the operating sleeve 33a is provided with a wedge or camming surface 34a which is adapted to engage beneath the free ends 34a of the spring arms 29a.

The coupling members may be connected by simply forcing the male coupling member into the female coupling member and the spring arms 29a will be shifted outwardly and will then snap into the groove 16. When it is desired to separate the coupling members, outward movement of the operating sleeve 33a will cause the cam surface 34a to engage beneath the ends 35a of the spring arms and shift the spring arms outwardly away from engagement with the wall of the groove 16.

From the foregoing description, it will be seen that the present invention provides a highly efficient and compact coupling assembly wherein the coupling members can be rapidly attached and detached. The connection between the coupling members can be effected without manual operation of the spring holding means and in separating the coupling members, the operating sleeve is shifted outwardly in the direction in which the male coupling member is withdrawn so as to simplify the separation. The spring arms and the groove 16 constitute complementary holding means which present interengaging or abutting surfaces adapted to prevent separation of the coupling members. Any tendency to separate the coupling members will merely force the spring arms downwardly into the groove. The valve in the female coupling member is automatically opened upon connection between the male and female coupling members and when the coupling members are separated, the valve surface 27 is forced into engagement with the packing washer 22 so as to compress the packing washer against the shoulder portion 19. If desired, spring means may be employed for forcing the valve member 27 to its seated position.

It is to be clearly understood that various changes in the details of construction and arrangement of parts may be made without departing from the scope of the invention as set forth in the appended claims.

We claim:

1. A coupling for joining fluid conduits and comprising male and female coupling members adapted to be quickly connected or separated, valve means carried by said female coupling member and adapted to be automatically opened upon connection of the coupling members and to be automatically closed upon separation of the coupling members, said male coupling member having an annular groove on the outer surface thereof, spaced spring arms carried by said female coupling member and engageable with said groove for holding said coupling members together and operable upon engagement with the male coupling member to permit movement of the coupling members toward one another for connecting the same, and a sleeve member carried by said female coupling member and engageable with said spring arms for withdrawing the said arms from engagement in said groove whereby to permit separation of the coupling members.

2. A coupling for joining fluid conduits and comprising male and female coupling members adapted to be quickly connected or separated, valve means carried by said female coupling member and adapted to be automatically opened upon connection of the coupling members and to be automatically closed upon separation of the coupling members, means providing an abutment surface on said male coupling member, said female coupling member having spaced lateral openings therethrough and in substantial alignment with the said abutment means when the coupling members are connected, spring arms carried by said female coupling member and extending through the said lateral openings and engageable with the abutment surface for preventing separation of said coupling members, and a sleeve member loosely mounted on said female coupling member and having a shoulder portion engageable with the ends of said spring arms for withdrawing the spring arms from engagement with said abutment means whereby to permit separation of the coupling members.

3. A coupling for joining fluid conduits and comprising male and female coupling members adapted to be quickly connected or separated, valve means carried by said female coupling member and adapted to be automatically opened upon connection of the coupling members and to be automatically closed upon separation of the coupling members, said male coupling member having an annular groove around the outer surface thereof and said female coupling member having spaced lateral openings therethrough and in substantial alignment with said groove when the coupling members are connected, a ring member secured to the free end of said female coupling member and having inwardly directed spring arms spaced symmetrically with respect to said lateral openings and extending through the said openings for engagement in the groove whereby to prevent separation of the coupling members, the free ends of said spring arms extending outwardly beyond the outer surface of said female coupling member, and a sleeve member substantially housing the free ends of said spring arms and engageable therewith for withdrawing the said arms from engagement in the groove whereby to permit separation of the coupling members.

4. A coupling for joining fluid conduits and comprising male and female coupling members adapted to be quickly connected or separated, valve means carried by said female coupling member and adapted to be automatically opened upon connection of the coupling members and to be automatically closed upon separation of the coupling members, said male coupling member having an annular groove around the outer surface thereof and said female coupling member having spaced lateral openings therethrough and in substantial alignment with said groove when the coupling members are connected, a ring member secured to the free end of said female coupling member and having inwardly directed spring arms spaced symmetrically with respect to said lateral openings and extending through the said openings for engagement in the groove whereby to prevent separation of the coupling members, the free ends of said spring arms extending beyond the outer surface of the female coupling member and being inclined with respect to the axis thereof, and a sleeve member loosely carried by said female coupling member and having a cam surface engageable beneath the free ends of said spring arms for withdrawing the arms from engagement in said groove whereby to permit separation of the coupling members.

5. A coupling for joining fluid conduits and comprising cooperating coupling members adapted to be quickly connected or separated, complementary and interengageable holding means on the coupling members for normally preventing separation thereof, said holding means including a leaf spring element carried by one of the coupling members and yieldably displaceable upon engagement with the other coupling member for permitting movement of the said coupling members toward one another to effect coupling thereof and engageable with said other coupling member to hold the coupled relation of the coupling members, and manually operable means for displacing the leaf spring element to permit separation of the coupling members, said spring element being free to move independent of said manually operable means during the movement of the coupling members into coupled relation.

6. A coupling for joining fluid conduits and comprising cooperating coupling members adapted to be quickly connected or separated, means providing an abutment surface on one of said coupling members, leaf spring arms on the other of said coupling members and yieldable to permit connection of the coupling members but engageable with the said abutment surface to prevent separation of the connected coupling members, and means carried by one of said coupling members and shiftable toward the other of said coupling members in the direction of withdrawal thereof for moving the said spring arms out of engagement with the said abutment surface whereby to permit separation of the coupling members.

ARTHUR L. PARKER.
JOHN N. WOLFRAM.